(12) United States Patent  
Hyodo

(10) Patent No.: US 7,643,068 B2  
(45) Date of Patent: Jan. 5, 2010

(54) WHITE BALANCE CONTROL METHOD, WHITE BALANCE CONTROL APPARATUS AND IMAGE-TAKING APPARATUS

(75) Inventor: Manabu Hyodo, Asaka (JP)

(73) Assignee: Fujifilm Corporation, Tokyo (JP)

( * ) Notice: Subject to any disclaimer, the term of this patent is extended or adjusted under 35 U.S.C. 154(b) by 547 days.

(21) Appl. No.: 11/349,258

(22) Filed: Feb. 8, 2006

(65) Prior Publication Data

US 2006/0176379 A1    Aug. 10, 2006

(30) Foreign Application Priority Data

Feb. 9, 2005  (JP) .............................. 2005-033385

(51) Int. Cl.  
    *H04N 9/73* (2006.01)
(52) U.S. Cl. ................. 348/223.1; 348/224.1; 348/371; 358/516
(58) Field of Classification Search ............... 348/223.1, 348/224.1, 225.1, 226.1, 227.1, 228.1  
See application file for complete search history.

(56) References Cited

U.S. PATENT DOCUMENTS 6,952,225 B1 * 10/2005 Hyodo et al. ............ 348/223.1

| | | | |
|---|---|---|---|
| 7,146,041 B2 * | 12/2006 | Takahashi | 382/167 |
| 7,362,356 B2 * | 4/2008 | Ikeda et al. | 348/223.1 |
| 7,423,674 B2 * | 9/2008 | Takeshita | 348/223.1 |
| 7,551,206 B2 * | 6/2009 | Fuyuki | 348/223.1 |
| 2004/0095478 A1 * | 5/2004 | Takano et al. | 348/223.1 |
| 2004/0212691 A1 * | 10/2004 | Sato | 348/223.1 |
| 2005/0286097 A1 * | 12/2005 | Hung et al. | 358/509 |
| 2007/0024719 A1 * | 2/2007 | Sakurai | 348/223.1 |

FOREIGN PATENT DOCUMENTS

| JP | 3-259692 A | 11/1991 |
|---|---|---|
| JP | 2003-224863 A | 8/2003 |
| JP | 2004-173010 A | 6/2004 |

* cited by examiner

*Primary Examiner*—Ngoc-Yen T Vu  
(74) *Attorney, Agent, or Firm*—Birch, Stewart, Kolasch & Birch, LLP

(57) ABSTRACT

According to the present invention, it is possible, by using the first and second light source loci, to tone down the influence of the object color of the color information in the image and detect the light source based on the color information having the influence of the object color toned down so as to detect the light source accurately. It is thereby possible to reduce the color failure when controlling the white balance.

15 Claims, 12 Drawing Sheets

FIG.12

| 1 | 1 | 1 | 1 | 1 | 1 | 1 | 1 |
|---|---|---|---|---|---|---|---|
| 1 | 4 | 16 | 16 | 16 | 16 | 4 | 1 |
| 1 | 4 | 32 | 32 | 32 | 32 | 4 | 1 |
| 1 | 4 | 32 | 64 | 64 | 32 | 4 | 1 |
| 1 | 4 | 32 | 64 | 64 | 32 | 4 | 1 |
| 1 | 4 | 32 | 32 | 32 | 32 | 4 | 1 |
| 1 | 4 | 16 | 16 | 16 | 16 | 4 | 1 |
| 1 | 1 | 1 | 1 | 1 | 1 | 1 | 1 |

WHITE BALANCE CONTROL METHOD, WHITE BALANCE CONTROL APPARATUS AND IMAGE-TAKING APPARATUS

BACKGROUND OF THE INVENTION

1. Field of the Invention

The present invention relates to a white balance control method, a white balance control apparatus and an image-taking apparatus, and in particular, to the white balance control method, white balance control apparatus and image-taking apparatus capable of high-precision white balance control for determining a light source accurately.

2. Description of the Related Art

Conventionally, a digital camera has a white balance adjustment made therein in order to have a white subject reproduced in white in an image irrespective of a color temperature of a light source. For instance, Japanese Patent Application Laid-Open No. 2003-224863 discloses a white balance control method for setting an ambient light source based on a luminance level and color information of a taken image and exerting white balance control so that a color of the ambient light source becomes a predetermined color.

SUMMARY OF THE INVENTION

According to the related art described above, however, there are the cases where, in photographing a chromatic-colored subject including no achromatic color, the color of the light source cannot be accurately detected due to influence of an object color on detecting the light source. For instance, the light source may easily be mistaken for a fluorescent lamp in the cases where green occupies a large percent, such as an image photographed in a forest outdoors. In particular, the light source may be mistaken more easily as to the green photographed in a dark place such as a shaded area. For this reason, there is a problem that, in the case of exerting the white balance control according to the color of the mistaken light source, there may be a color failure in which the green as the object color of the subject is toned down and overly becomes complementary green.

The present invention has been made in view of such circumstances, and an object thereof is to provide a white balance control method, a white balance control apparatus and an image-taking apparatus capable of detecting the light source accurately and reducing the color failure.

To achieve the object, a white balance control method according to a first aspect of the present invention comprises the steps of: (a) dividing an image inputted via an imaging device into multiple divided areas and obtaining a color information on each divided area; (b) correcting distribution of the color information in the multiple divided areas of a predetermined color space based on light source loci which are loci of a color change of an object due to a color temperature on the color space; (c) obtaining a light source information under photographing conditions based on the color information corrected in the step (b); (d) calculating a white balance correction value based on the light source information obtained in the step (c); and (e) controlling a white balance based on the white balance correction value calculated in the step (d).

A white balance control apparatus according to a second aspect of the present invention comprises: a color information obtaining device which divides an image inputted via an imaging device into multiple divided areas and obtains color information on each divided area; a color information correcting device which corrects distribution of the color information in the multiple divided areas of a predetermined color space based on light source loci which are loci of a color change of an object due to a color temperature on the color space; a light source information obtaining device which obtains light source information under photographing conditions based on the corrected color information; a white balance correction value calculating device which calculates a white balance correction value based on the obtained light source information; and a white balance adjusting device which adjusts a white balance based on the calculated white balance correction value.

According to the first and second aspects, it is possible to obtain accurate light source information by using the color information which is corrected based on the light source loci and has influence of an object color toned down in detecting the light source.

A third aspect of the present invention is in the first aspect, in the step (b), the light source loci are a first light source locus indicating the color change on changing the color temperature of a light source and a second light source locus different from the first light source locus; no correction is made to the color information distributed at a position sandwiched between the first and second light source loci; and the color information distributed at a position not sandwiched between the first and second light source loci is brought close to a nearer one of the first and second light source loci.

A fourth aspect of the present invention is in the second aspect, the light source loci are a first light source locus indicating the color change on changing the color temperature of a light source and a second light source locus different from the first light source locus; and the color information correcting device makes no correction to the color information distributed at a position sandwiched between the first and second light source loci and brings the color information distributed at a position not sandwiched between the first and second light source loci close to a nearer one of the first and second light source loci. The third and fourth aspects limit modes of correction of the color information of the second aspect and third aspect, respectively.

The white balance control apparatus according to a fifth aspect is in the second or fourth aspect, the second light source locus is the light source locus going through color distribution in the case of using a cool white fluorescent lamp as the light source or more distant from the first light source locus than the color distribution. The fifth aspect limits the second light source locus of the second or fourth aspect.

The white balance control apparatus according to a sixth aspect is in any of the second, fourth and fifth aspects, the second light source locus is located lower than the first light source locus in R/G and B/G color space. The sixth aspect limits relative positions of the first and second light source loci of the second, fourth and fifth aspects.

The white balance control apparatus according to a seventh aspect is in any of the second, fourth, fifth and sixth aspects, the color information obtaining device calculates an integrated value of R, G and B signals of the color information in the divided areas to calculate an R-to-G ratio and a B-to-G ratio; and the color information correcting device moves the color information distributed higher than the first light source locus closer to the first light source locus and moves the color information distributed lower than the second light source locus closer to the second light source locus in the R/G and B/G color space.

The white balance control apparatus according to an eighth aspect is in the seventh aspect, the color information correcting device brings the color information distributed higher than the first light source locus closer to the first light source locus in an R/G direction and brings the color information distributed lower than the second light source locus closer to a normal direction of the second light source locus in the R/G and B/G color space. The seventh and eighth aspects limit a moving direction of the color information of the second, fourth, fifth and sixth aspects in the R/G and B/G color space.

The white balance control apparatus according to a ninth aspect is in any of the second, fourth, fifth, sixth and seventh aspects, the color information correcting device changes a correction amount of the color information according to a distance between the first or second light source locus and the color information in the R/G and B/G color space. The ninth aspect limits the mode of calculating the correction amount of the color information (travel distance in the R/G and B/G color space).

The white balance control apparatus according to a tenth aspect is in any of the second, fourth, fifth, sixth, seventh and eighth aspects, the light source information obtaining device calculates first color information from the distribution of the corrected color information in the R/G and B/G color space and obtains the light source information based on RIG and B/G color coordinates of the first color information. The tenth aspect limits the mode of obtaining the color information of the second, fourth, fifth, sixth; seventh and eighth aspects.

The white balance control apparatus according to an eleventh aspect is in the tenth aspect, the light source information obtaining device uses second color information as a light source detection value, the second color information calculated from the distribution of the color information distributed in a circle of which radius is a line segment connecting a reference point of the R/G and B/G color space as a center thereof to the first color information.

The white balance control apparatus according to the eleventh aspect only uses the color information in proximity to the reference point of the R/G and B/G color space so as to tone down the influence of the object color when obtaining the light source information.

The white balance control apparatus according to a twelfth aspect is in the tenth or eleventh aspect, the light source information obtaining device calculates the first or second color information by means of weighted average of the color information.

The white balance control apparatus according to the twelfth aspect can reduce a weight assigned to the color information distant from the reference point of the R/G and B/G color space so as to tone down the influence of the object color when obtaining the light source information.

An image-taking apparatus according to a thirteenth aspect comprises the white balance control apparatus according to any one of the second, fourth to twelfth aspects.

According to the present invention, it is possible, by using the first and second light source loci, to tone down the influence of the object color of the color information in the image and detect the light source based on the color information having the influence of the object color toned down so as to detect the light source accurately. It is thereby possible to reduce the color failure when controlling the white balance.

BRIEF DESCRIPTION OF THE DRAWINGS

FIG. 12 is a diagram showing values of the weights on S1 photometry related to divided areas of an image;

DETAILED DESCRIPTION OF THE PREFERRED EMBODIMENTS

Hereunder, a description will be given according to the attached drawings as to preferred embodiments of a white balance control method, a white balance control apparatus and an image-taking apparatus according to the present invention. The following description will be given by taking the image-taking apparatus (digital camera) to which the white balance control apparatus of the present invention is applied as an example. However, the present invention is also applicable to a cellular phone, a personal digital assistant (PDA), a PC camera and the like having the image taking apparatus.

Figure 1:
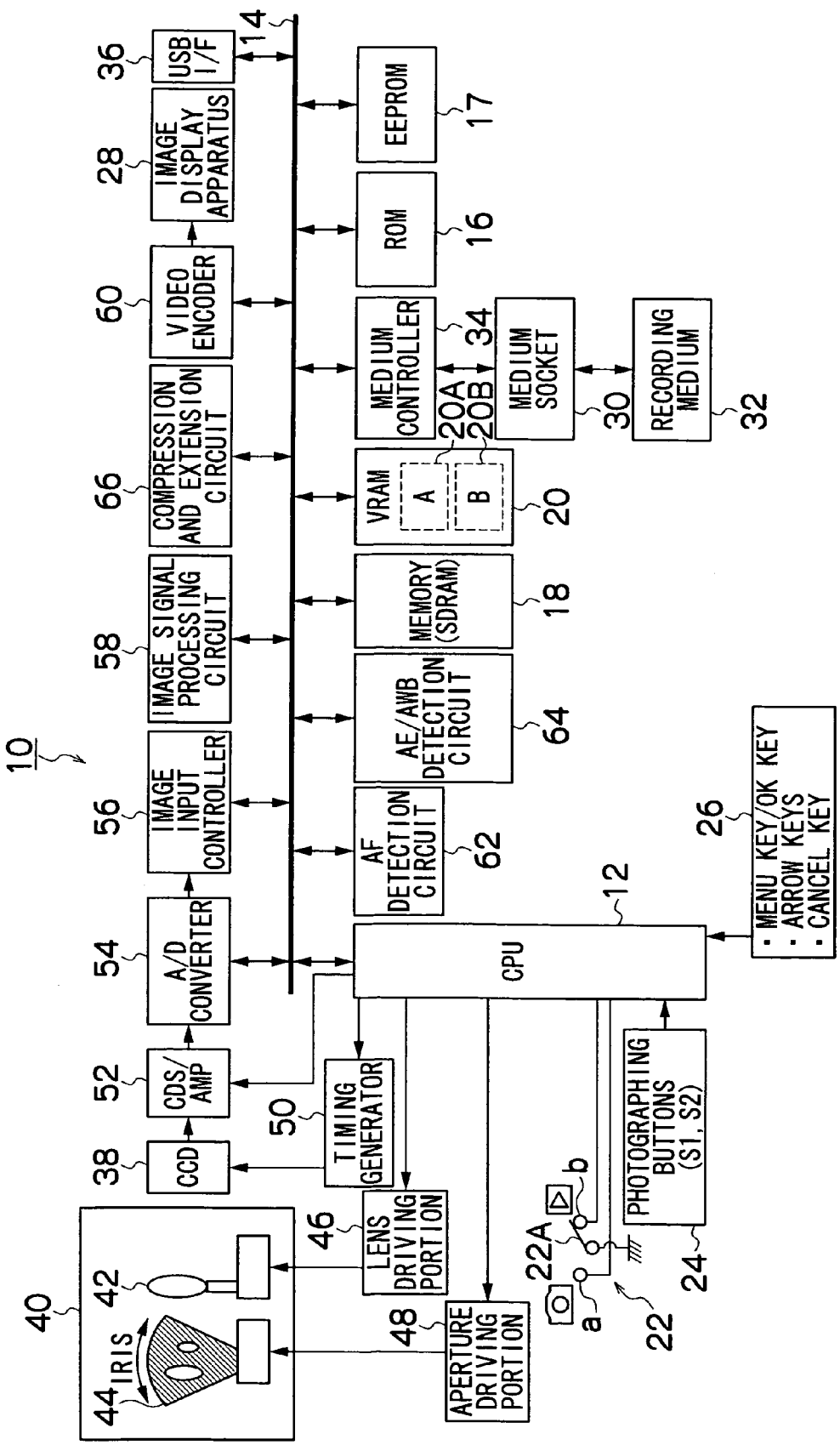
FIG. 1 is a block diagram showing an image-taking apparatus to which a white balance control apparatus according to an embodiment of the present invention is applied.

FIG. 1 is a block diagram showing an image-taking apparatus 10 to which the white balance control apparatus according to an embodiment of the present invention is applied. The image-taking apparatus 10 shown in FIG. 1 is a digital camera having functions of recording and reproducing a still image and a moving image, and an operation of the entire image-taking apparatus 10 is subject to centralized control by a central processing unit (CPU) 12. The CPU 12 functions as a control device which controls this camera system according to a predetermined program, and also functions as a calculation device which performs various calculations, such as an automatic exposure (AE) calculation, an automatic focusing (AF) calculation and a white balance (WB) adjustment calculation.

An ROM 16 connected to the CPU 12 via a bus 14 has a program to be executed by the CPU 12, various kinds of data necessary for the control and the like stored therein, and an EEPROM 17 has CCD pixel defect information, various constants and information on a camera operation and the like stored therein.

A memory (SDRAM) 18 is used as a program expansion area and a calculation work area of the CPU 12, and is also used as a temporary storage area of image data and audio data. A VRAM 20 is a temporary storage memory dedicated to image data, and includes an A area 20A and a B area 20B. It is possible to share the memory 18 and VRAM 20.

The digital camera 10 has operating devices 26 including a mode selection switch 22, a photographing button 24 as well as a menu/OK key, arrow keys, a cancel key and so on. Signals from these operating portions (22 to 26) are inputted to the CPU 12. The CPU 12 controls circuits of the digital camera 10 based on these input signals so as to control lens driving, photographing operation, image processing, recording and reproduction of the image data and display of an image display apparatus 28 for instance.

The mode selection switch 22 is an operating device for the sake of switching an operation mode of the digital camera 10. If the mode selection switch 22 is operated to have a movable contact 22A connected to a contact point a, a signal indicating it is inputted to the CPU 12 so that the digital camera 10 is set to a photographing mode. If the movable contact 22A is connected to a contact point b, the digital camera 10 is set to a reproducing mode for reproducing a recorded image.

The photographing button 24 is an operating button for inputting an instruction to start photographing, and is configured by two-stroke switches of an S1 switch to be on when half pushed and an S2 switch to be on when fully pushed.

The menu/OK key is an operating key combining a function as a menu button for providing an instruction to display a menu on a screen of the image display apparatus 28 with a function as an OK button for providing an instruction to determine and execute selected contents. The arrow keys are operating keys for inputting instructions of four directions of left, right, up and down, and function as buttons for selecting an item from a menu screen and providing an instruction to select various setup items from each menu (cursor moving operation device). The up and down keys of the arrow keys function as a zoom switch on photographing or a reproduction zoom switch on reproduction, and the left and right keys function as a frame advance (forward/backward advance) button on the reproduction mode. The cancel key is used when erasing a desired target such as a selection item, canceling instruction contents or returning to an immediately preceding operating status.

The image display apparatus 28 is configured by a liquid crystal display capable of color display. The image display apparatus 28 can be used as an electronic finder for checking a field angle on photographing and also as a device which reproduces and displays a recorded image. The image display apparatus 28 is also used as a display screen for a user interface, where the information such as menu information, selection items and setup contents is displayed as necessary. It is also possible to use the display apparatus (display device) of another method such as organic EL instead of the liquid crystal display.

The digital camera 10 has a medium socket (medium mounting portion) 30 which can have a recording medium 32 mounted thereon. A form of the recording medium is not especially limited, and various media are usable, such as a semiconductor memory card represented by xD-Picture-Card™ and SmartMedia™, a portable small-size hard disk, a magnetic disk, an optical disk and a magnetic-optical disk.

A medium controller 34 performs signal conversion necessary to deliver and receive input and output signals suited to the recording medium 32 mounted on the medium socket 30.

The digital camera 10 is provided with a USB interface portion (USB I/F) 36 as a communication device for connecting to external equipment such as a personal computer. It is possible to deliver and receive data to and from the external equipment by connecting the digital camera 10 to the external equipment by using a USB cable not shown. As a matter of course, a communication method is not limited to the USB, but IEEE1394, Bluetooth and other communication methods are also applicable.

Next, a photographing function of the digital camera 10 will be described. If the operation mode of the digital camera 10 is set to the photographing mode by the mode selection switch 22, power is supplied to an image-taking portion including a color CCD solid-state image sensing device (hereafter, referred to as a CCD) 38 to be in a photographable state.

A lens unit 40 is an optical unit including a photographing lens 42 comprising a focus lens and a mechanical shutter doubling as an aperture 44. The lens unit 40 is electrically driven by a lens driving portion 46 and an aperture driving portion 48 controlled by the CPU 12 to have zoom control, focus control and iris control exerted thereon.

Light having passed through the lens unit 40 is focused onto an acceptance surface of the CCD 38. The acceptance surface of the CCD 38 has a large number of photo diodes (light receiving elements) arranged two-dimensionally thereon, and also has primary-color filters of red (R), green (G) and blue (B) placed in a predetermined array structure (such as Bayer or G stripe) correspondingly to each photo diode. The CCD 38 has an electronic shutter function of controlling a charge storage time (shutter speed) of each photo diode. The CPU 12 controls the charge storage time of the CCD 38 via a timing generator 50. It is also possible to use an imaging device of another method such as an MOS type instead of the CCD 38.

A subject image focused onto the acceptance surface of the CCD 38 is converted to signal charge of an amount corresponding to an amount of incident light by each photo diode. The signal charge stored in each photo diode is sequentially read as a voltage signal (image signal) according to the signal charge based on a drive pulse provided from the timing generator 50 in compliance with an instruction from the CPU 12.

The signal outputted from the CCD 38 is transmitted to an analog processing portion (CDS/AMP) 52, where R, G and B signals of each pixel are sampled and held (correlated double sampling process) and amplified to be added to an A/D converter 54 thereafter. The dot sequential R, G and B signals converted to digital signals by the A/D converter 54 are stored in the memory 18 via an image input controller 56.

An image signal processing circuit 58 processes the R, G and B signals stored in the memory 18 according to the instruction from the CPU 12. To be more specific, the image signal processing circuit 58 functions as an image processing device including a coincidence circuit (a processing circuit for interpolating spatial deviations of color signals accompanying a color filter arrangement of a single-plate CCD to convert the color signals coincidentally), a white balance correction circuit, a gamma correction circuit, a profile correction circuit, a luminance and color difference signal generation circuit and so on, and performs predetermined signal processing while exploiting the memory 18 according to a command from the CPU 12.

The R, G and B image data inputted to the image signal processing circuit 58 is converted to luminance signals (Y signals) and color-difference signals (Cr and Cb signals) therein, and also undergoes predetermined processing such as gamma correction. The image data processed in the image signal processing circuit 58 is stored in the VRAM 20.

In the case of monitor-outputting a photographing image to the image display apparatus 28, the image data is read from the VRAM 20 and transmitted to a video encoder 60 via the bus 14. The video encoder 60 converts the inputted image data to a signal of a predetermined method for display (a color composite picture signal of an NTSC method for instance) and outputs it to the image display apparatus 28.

The image data representing an image equivalent to one frame is rewritten by the image signal outputted from the CCD 38 alternately in the A area 20A and B area 20B. Of the A area 20A and B area 20B of the VRAM 20, the written image data is read from the area other than the area having the image data rewritten therein. Thus, the image data in the VRAM 20 is periodically rewritten, and a video signal generated from the image data is supplied to the image display apparatus 28 so as to have a video currently imaged displayed on the image display apparatus 28 in real time. A photographer can check the photographing field angle with the video (through-movie image) displayed on the image display apparatus 28.

If the photographing button 24 is half pushed (S1=ON), the digital camera 10 starts the AE and AF processing. To be more specific, the image signal outputted from the CCD 38 is inputted to an AF detection circuit 62 and an AE/AWB detection circuit 64 via the image input controller 56 after A/D conversion.

The AE/AWB detection circuit 64 divides one screen into multiple areas (8×8 to 16×16 for instance), and includes a circuit for integrating the RGB signals per divided area so as to provide an integrated value thereof to the CPU 12. The CPU 12 detects brightness (subject luminance) of the subject based on the integrated value obtained from the AE/AWB detection circuit 64, and calculates an exposure value (photographing EV value) suited to the photographing. An aperture value and the shutter speed are decided according to the acquired exposure value and a predetermined program diagram, and the CPU 12 controls an electronic shutter and an iris of the CCD 38 in compliance therewith to obtain proper light exposure.

When automatically adjusting the white balance, the AE/AWB detection circuit 64 calculates an average integrated value of each color of the RGB signals per divided area, and provides a calculation result thereof to the CPU 12. The CPU 12 obtains the integrated value of R, integrated value of B and integrated value of G, acquires the ratios of R/G and B/G per divided area, and determines a light source type based on distribution of the values of R/G and B/G in the color space of R/G and B/G axis coordinates so as to control gain values (white balance correction values) for the R, G and B signals of a white balance adjustment circuit according to the determined light source type and correct the signal of each color channel. Details of the white balance adjustment will be described later.

As for AF control of the digital camera 10, contrast AF is applied, which moves a focusing lens (of a lens optical system configuring the photographing lens 42, a moving lens contributing to focus adjustment) to maximize a high-frequency component of a G signal of the video signal for instance. To be more specific, the AF detection circuit 62 is configured by a high-pass filter for passing only the high-frequency component of the G signal, an absolutizing processing portion, an AF area extracting portion for cutting a signal in a focus subject area preset in the screen (center of the screen for instance) and an integrating portion for integrating absolute value data in the AF area.

The CPU 12 is notified of the data on the integrated value acquired in the AF detection circuit 62. The CPU 12 calculates a focus evaluation value (AF evaluation value) at multiple AF detection points while controlling the lens driving portion 46 and moving the focusing lens, and decides a lens position at which the evaluation value becomes maximum as a focused position. And the CPU 12 controls the lens driving portion 46 to move the focusing lens to the acquired focused position. The calculation of the AF evaluation value is not limited to the mode of using the G signal but the luminance signal (Y signal) may also be used.

If the AE/AF processing is performed by pushing the photographing button 24 half (S1=ON) as described above, the photographing operation for recording is started by fully pushing the photographing button 24 (S2=ON). The image data obtained according to S2=ON is converted to the luminance and color difference signal (Y/C signal) in the image signal processing circuit 58 and undergoes the predetermined processing such as the gamma correction so as to be stored in the memory 18 thereafter.

The Y/C signal stored in the memory 18 is compressed in a predetermined format by a compression and extension circuit 66, and is recorded on the recording medium 32 via the medium controller 34 thereafter. For instance, the still image is recorded in a JPEG (Joint Photographic Experts Group) format.

If a reproduction mode is selected by the mode selection switch 22, compressed data of a last image file recorded on the recording medium 32 (lastly recorded file) is read. In the case where the lastly recorded file is a still image file, the read image compressed data is extended to an uncompressed YC signal via the compression and extension circuit 66 and converted to a signal for display via the image signal processing circuit 58 and the video encoder 60 to be outputted to the image display apparatus 28 thereafter. Thus, the image contents of the file are displayed on the screen of the image display apparatus 28.

It is possible to switch the file to be reproduced by manipulating the right key or left key of the arrow keys (forward/backward advance) during reproduction of one frame of the still image (including reproduction of a top frame of the moving image). The image file at an advanced position is read from the recording medium 32, and the still image and moving image are displayed on the image display apparatus 28 as with the above.

Figure 2:
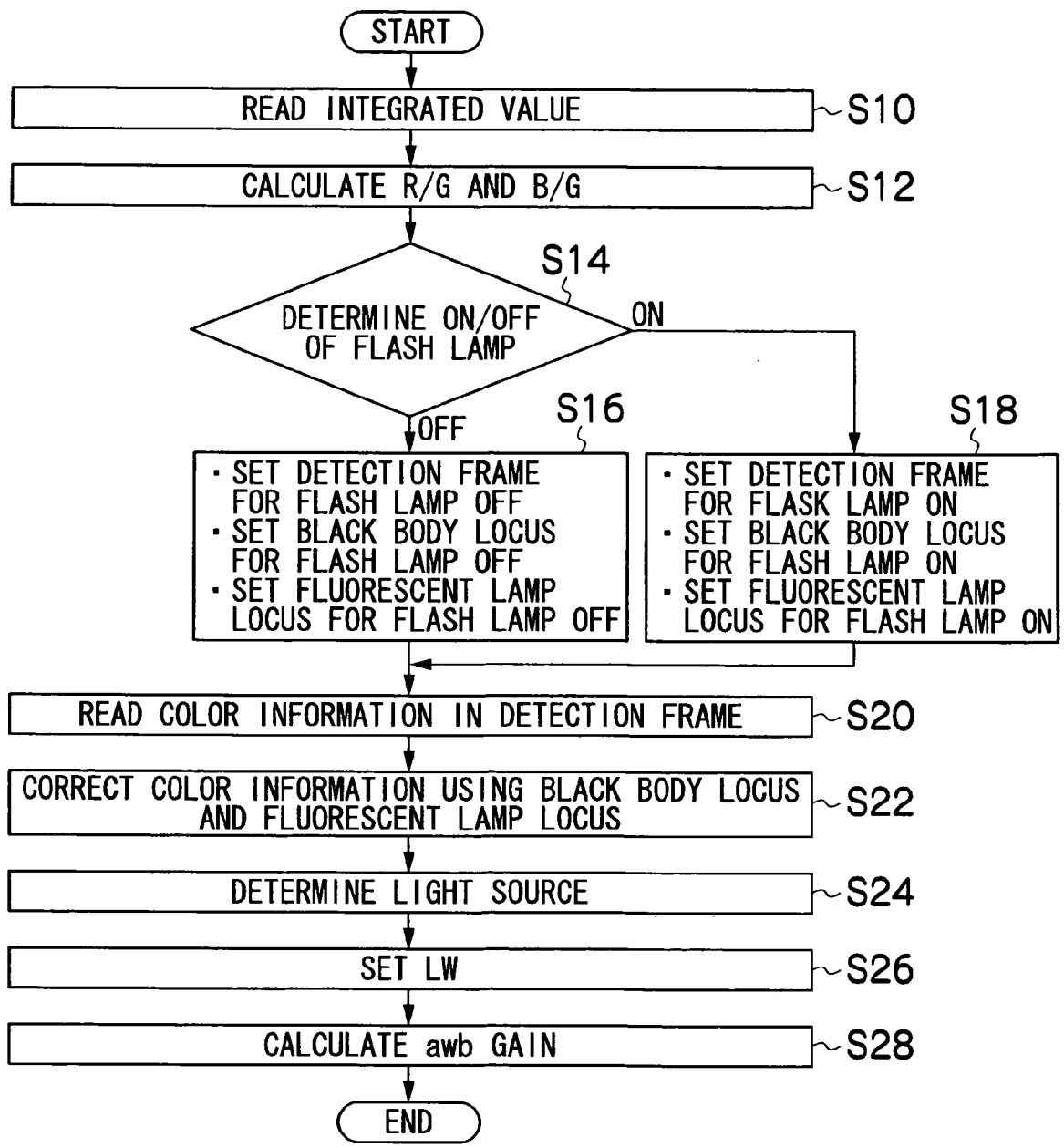
FIG. 2 is a flowchart showing a white balance control method according to a first embodiment of the present invention.

Next, the white balance control method according to the present invention will be described. FIG. 2 is a flowchart showing the white balance control method according to a first embodiment of the present invention. First, the photographing button 24 is pushed to photograph the subject. The R, G and B signals obtained from the CCD 38 on the photographing are stored in the memory 18 once. And the R, G and B signals stored in the memory 18 are used to calculate the average integrated value of each color of the R, G and B signals for each of 64 divided areas which are one screen divided into 8×8 (step S10) so as to calculate the ratios of the average integrated values of the R, G and B signals (R/G and B/G) per divided area (step S12). It is possible, based on the R/G and B/G values, to represent color information on each of the 64 divided areas calculated in the step S12 as 64 points distributed on the color space of R/G and B/G axis coordinates (referred to as R/G and B/G color space in the following description).

As for the divided areas, it is possible, even in the case where an electronic zoom is performed, to render one screen, that is, the screen before cutting it with the electronic zoom as 64 divided areas divided into 8×8.

Next, it branches according to on/off of a flash lamp on photographing (step S14). In the case where the flash lamp is off on photographing, a detection frame for a flash lamp off, the first and second light source loci are then set up in the R/G and B/G color space (step S16). In the case where the flash lamp is on photographing, a detection frame for a flash lamp on and the first and second light source loci are then set up in the R/G and B/G color space (step S18).

Figure 3:
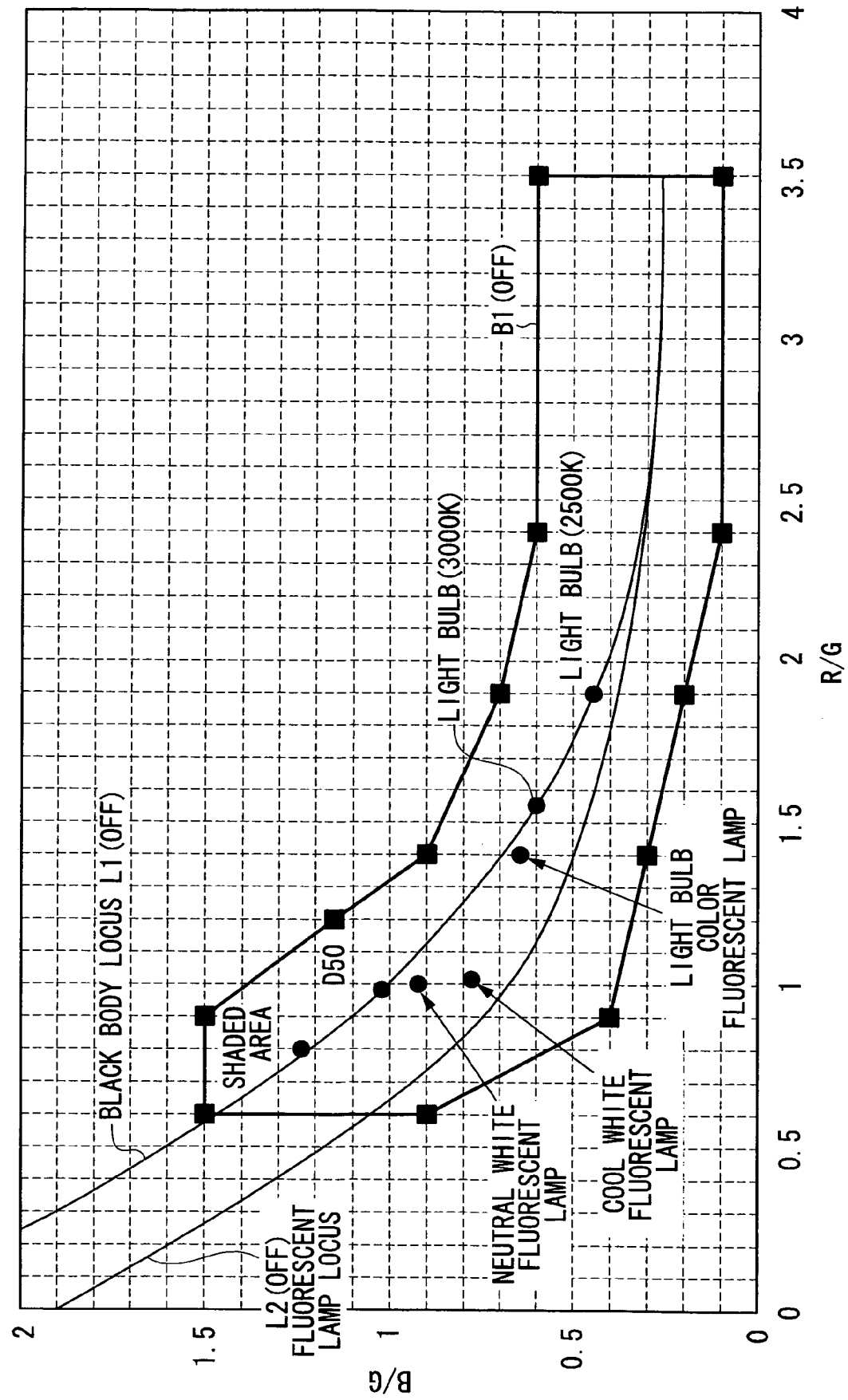
FIG. 3 is a graph showing a detection frame for a flash lamp off and first and second light source loci in R/G and B/G color space.
Figure 4:
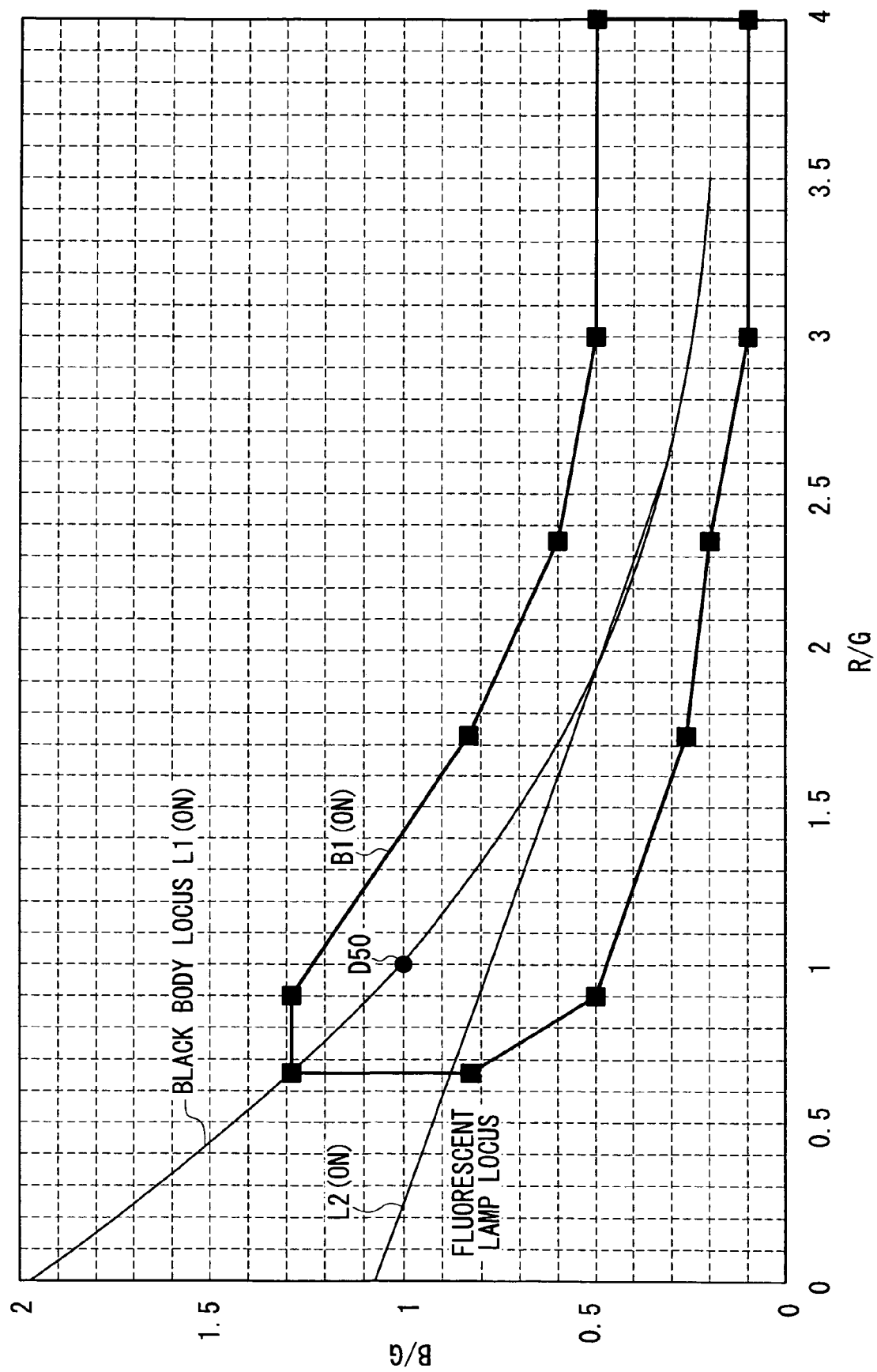
FIG. 4 is a graph showing the detection frame for a flash lamp on and the first and second light source loci in the R/G and B/G color space.

FIG. 3 is a graph showing the detection frame for the flash lamp off and the first and second light source loci in the R/G and B/G color space. FIG. 4 is a graph showing the detection frame for the flash lamp on and the first and second light source loci in the R/G and B/G color space. In FIGS. 3 and 4, a horizontal axis indicates the R/G signal value and a vertical axis indicates the B/G signal value.

A first light source locus L1 is a locus of color change in a black body when changing the color temperature of the light source (daylight or tungsten light source), and passes through a reference point D50 (1, 1) in the R/G and B/G color space. A second light source locus L2 (OFF) on the flash lamp off shown in FIG. 3 is a locus passing through color distribution in the case of using a cool white fluorescent lamp as the light source or more distant from the first light source locus L1 than the color distribution in case of using the cool white fluorescent lamp as the light source. The second light source locus L2 (ON) on the flash lamp on shown in FIG. 4 is the locus passing through the color distribution in the state of using the cool white fluorescent lamp as the light source with the flash lamp hard to reach or unreachable or more distant from the first light source locus L1 than the color distribution in the state of using the cool white fluorescent lamp as the light source with the flash lamp hard to reach or unreachable. The first embodiment is described by taking an example of the case where the first light source locus L1 is a black body locus and the second light source locus L2 is a fluorescent lamp locus. However, the present invention is not limited thereto. To be more specific, the first and second light source loci can be selected arbitrarily according to a purpose or a design. And it goes without saying that the second light source locus can be selected arbitrarily and suitably from the light source loci located below the first light source locus in the R/G and B/G color space. To be more specific, the first embodiment is described by taking an example of the case of using the second light source locus based on the color distribution when using the cool white fluorescent lamp as the light source. However, the light source locus using the color distribution of a mercury lamp may also be acquired and used for instance.

In the R/G and B/G color space shown in FIGS. 3 and 4, the color information on the cool white fluorescent lamp is distributed in a distant portion below the black body locus L1 in each of the drawings. The fluorescent lamp locus L2 is a curve passing through a color coordinate of the cool white fluorescent lamp (point P1 of FIG. 3), going away from the black body locus L1 as the value of R/G becomes smaller and getting closer to the black body locus L1 as the value of R/G becomes larger.

A detection frame B1 is the area expanding in a vertical (B/G axis) direction from the black body locus L1 and the fluorescent lamp locus L2. A range of the detection frame B1 is set empirically according to the distribution of the color information on the image for exerting the white balance control. As shown in FIGS. 3 and 4, the detection frame B1 (ON) on the flash lamp on is further extended to the +R/G side than the detection frame B1 (OFF) on the flash lamp off.

Next, the color information in the detection frame B1 is read (step S20). Of the read color information, corrections are made to the color information distributed on the upper side of the black body locus L1 and on the downside of the fluorescent lamp locus L2 of FIGS. 3 and 4 (step S22).

Figure 5:
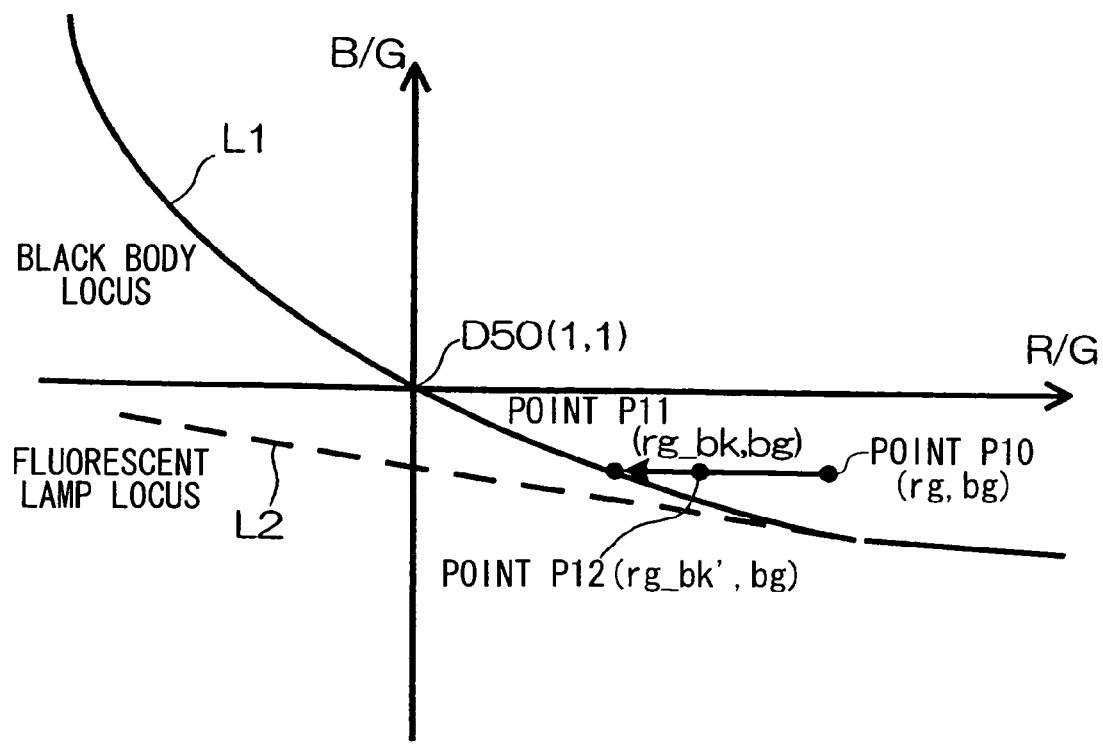
FIG. 5 is a diagram showing a method of correcting color information distributed above a black body locus.

FIG. 5 is a diagram showing a method of correcting the color information distributed above the black body locus. First, if the coordinates of the color information distributed above the black body locus L1 are P10 (rg, bg) and the coordinates of an equal B/G value thereto on the black body locus L1 are P11 (rg_bk, bg) as shown in FIG. 5, it is moved to a position P12 (rg_bk', bg) in the −R/G direction (leftward in FIG. 5) by the following formula (1). Here, a parameter α is a value in the range of about 0.6 to 0.9, and about 0.7 preferably.

$$rg\_bk' = rg - (rg - rg\_bk) \times \alpha \quad (1)$$

Figure 6:
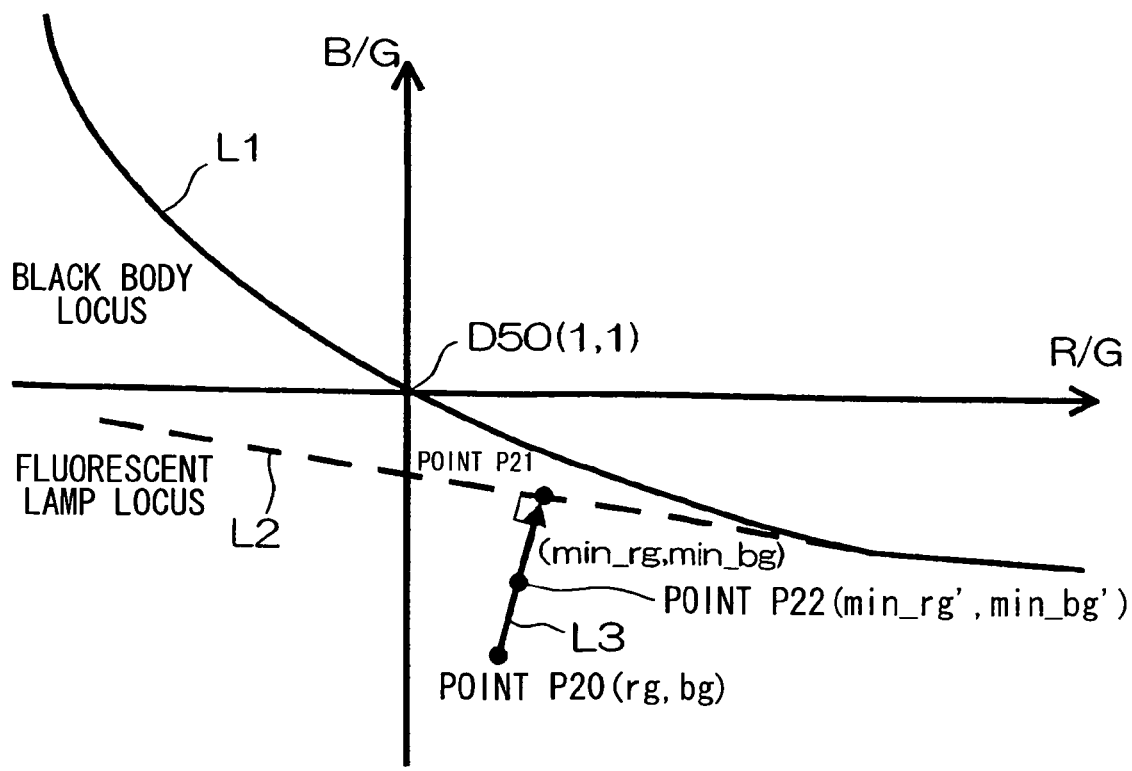
FIG. 6 is a diagram showing a method of correcting the color information distributed below a fluorescent lamp locus.

FIG. 6 is a diagram showing a method of correcting the color information distributed below the fluorescent lamp locus. As shown in FIG. 6, if the coordinates of the color information distributed below the fluorescent lamp locus L2 are P20 (rg, bg) and an intersection with a normal L3 extending from the point P20 to the fluorescent lamp locus L2 is P21 (min_rg, min_bg), coordinates P22 (min_rg', min_bg') of the corrected color information are represented by the following formulas (2) and (3). Parameters β and γ are values in the range of about 0.9 to 1.0, and about 1.0 preferably.

$$min\_rg' = rg + (min\_rg - rg) \times \beta \quad (2)\text{ps}$$

$$min\_bg' = bg + (min\_bg - bg) \times \gamma \quad (3)$$

In the formulas (1) to (3), the parameters α, β and γ may change according to distances from the black body locus and the fluorescent lamp locus (so that the more distant from both the light source loci, the smaller they become, for instance).

Figure 7:
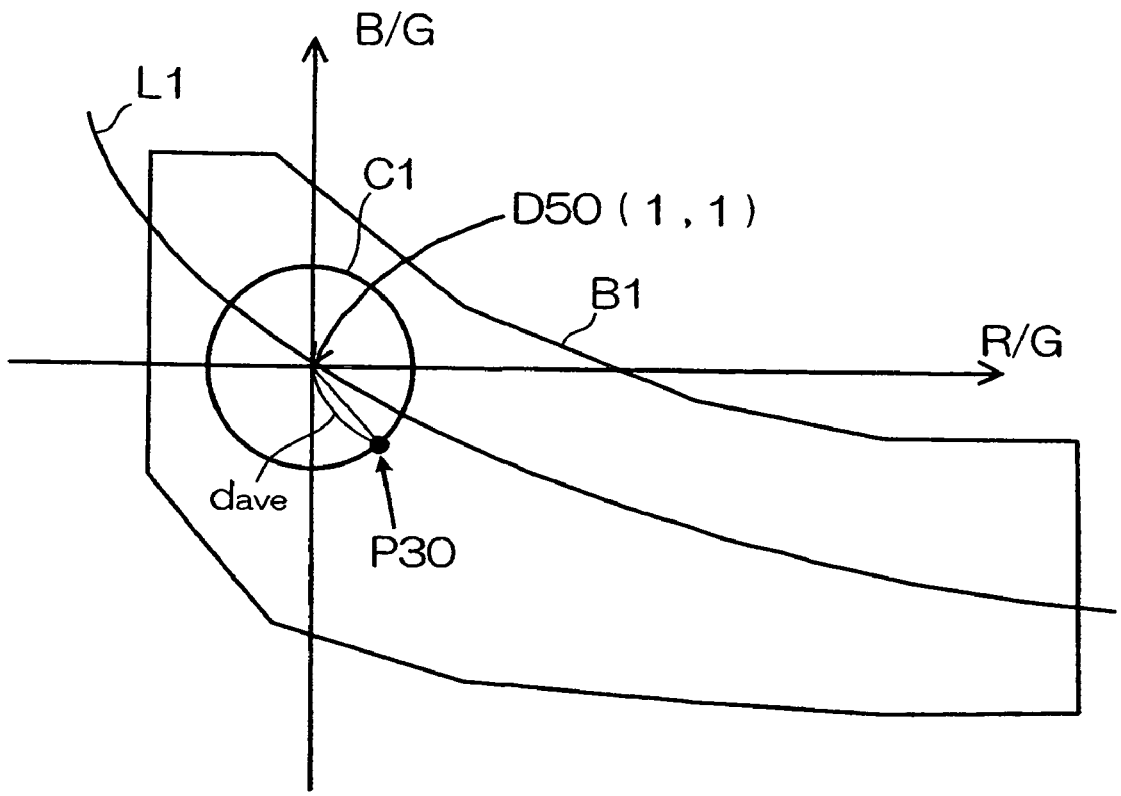
FIG. 7 is a diagram showing a light source detection value.
Figure 8:
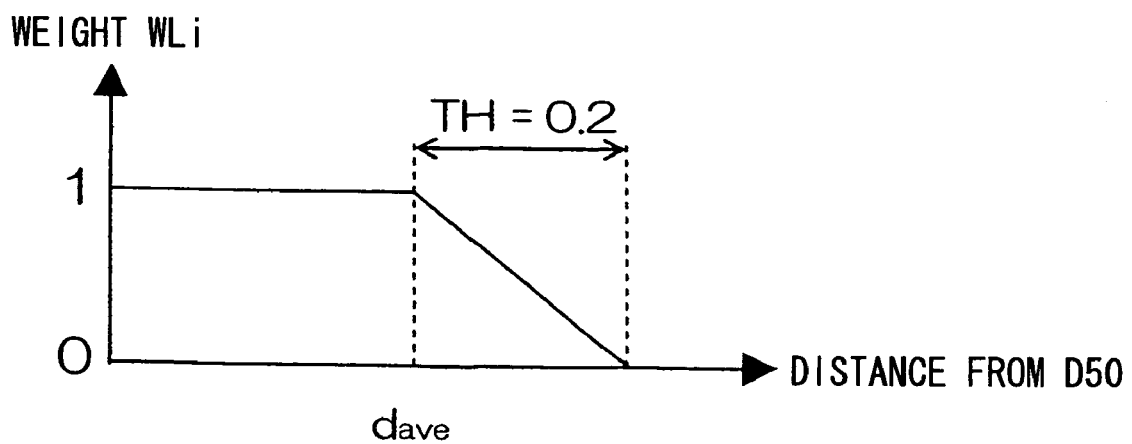
FIG. 8 is a graph showing a weight WLi.

Next, light source detection values (RG, BG) are calculated (step S24). In the step S24, first color information is calculated first from the distribution of the color information corrected in the step S22 by means of weighted average of the color information for instance. Subsequently, if the point indicating the first color information in the R/G and B/G color space is P30 as shown in FIG. 7, the light source detection values (RG, BG) are calculated by the following formulas (4) and (5) by calculating second color information from the color distribution in proximity to the reference point D50 (the point (1, 1) in this case) by means of weighted average of the color information for instance.

$$RG = \Sigma i x i W L i / \Sigma i\, W L i \quad (4)$$

$$BG = \Sigma i y i W L i / \Sigma i\, W L i \quad (5)$$

xi and yi in the formulas (4) and (5) are the values of the R/G signal and B/G signal respectively, and WLi is a weight. FIG. 8 is a graph showing the value of the weight WLi. As shown in FIG. 8, the weight WLi is 1.0 in a circle C1 centering on the point D50 and having a radius which is a distance dave between the first color information P30 and the reference point D50. Outside the circle C1, the more distant from the reference point D50, the smaller the weight WLi becomes.

Next, a low word correction coefficient Lw is set (step S26), and gains for the white balance control are calculated (step S28). A gain calculation method for the white balance control will be described hereunder. If reference gains prerecorded on the image-taking apparatus 10 (M-clear white balance gains on the flash lamp off for instance) are Rd, Gd and Bd, the gains necessary for complete correction (that is, the gains necessary to move the light source detection values (RG, BG) to the reference point D50) gri_t, gbi_t are represented by the following formulas (6) and (7).

$$gri\_t = Rd / (Gd \times RG) \quad (6)$$

$$gbi\_t = Bd / (Gd \times BG) \quad (7)$$

Therefore, 100-percent complete correction gains at the same level as the reference gain Gd are represented by the following formulas (8) to (10).

$$Gr = gri\_t \times Gd = Rd/RG \quad (8)$$

$$Gg = Gd \quad (9)$$

$$Gb = gbi\_t \times Gd = Bd/BG \quad (10)$$

And total gains are represented by the following formulas (11) to (13). The low word correction coefficient Lw is defined by a value in the range of 0 to 1.0 according to the distance between the light source detection values (RG, BG) and the reference point D50. The relation among the low word correction coefficient Lw and a distance between the light source detection values (RG, BG) and the reference point D50 is defined in the EEPROM 17.

$$Gr' = (Gr - Rd) \times Lw + Rd \quad (11)$$

$$Gg' = (Gg - Gd) \times Lw + Gd \quad (12)$$

$$Gb' = (Gb - Bd) \times Lw + Bd \quad (13)$$

The total gains on the flash lamp on are calculated as above based on the reference gains for the flash lamp on Rst, Gst and Bst and a low word correction coefficient Lwst and represented by the following formulas (14) to (16).

$$Grst' = (Gr - Rst) \times Lwst + Rst \quad (14)$$

$$Ggst' = (Gg - Gst) \times Lwst + Gst \quad (15)$$

$$Gbst' = (Gb - Bst) \times Lwst + Bst \quad (16)$$

The first embodiment tones down the influence of the object color on the color information in the image by using the first and second light source loci (black body locus and fluorescent lamp locus) and detects the light source based on the color information toning down the influence of the object color. Therefore, it is possible to detect the light source accurately. Thus, it is possible to reduce the color failure when controlling the white balance.

Figure 9:
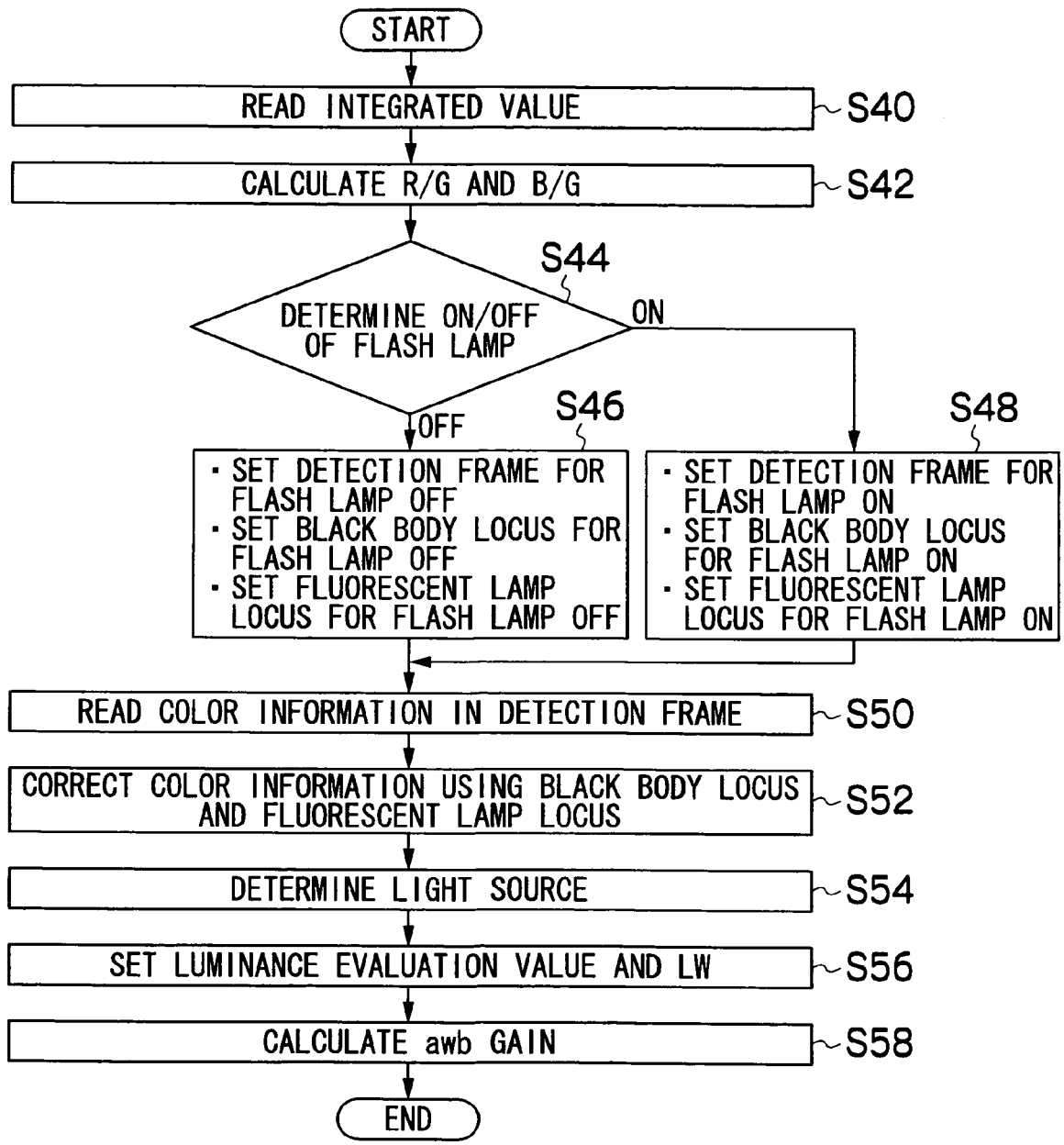
FIG. 9 is a flowchart showing the white balance control method according to a second embodiment of the present invention.

Next, a second embodiment of the present invention will be described. FIG. 9 is a flowchart showing the white balance control method according to the second embodiment of the present invention. Steps S40 to S54 are the same as the steps S10 to S24 of FIG. 2, and so descriptions thereof will be omitted.

Subsequently to the step 54, a luminance evaluation value Lwy and the low word correction coefficient Lw are set in the step S56. The low word correction coefficient Lw is the same as the above-described embodiment, and so a description thereof will be omitted.

Figure 10:
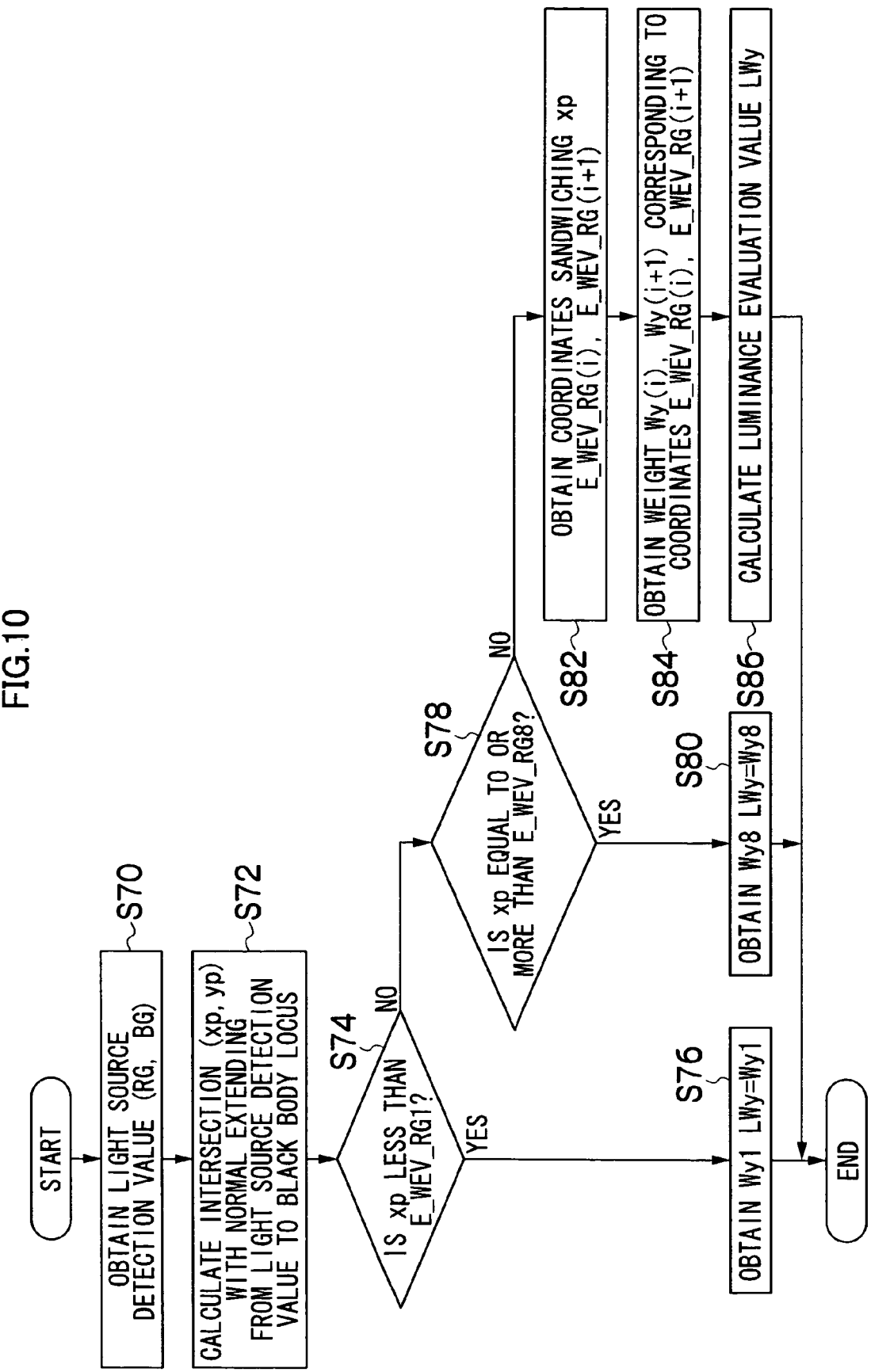
FIG. 10 is a flowchart showing a method of calculating a luminance evaluation value Lwy.
Figure 11:
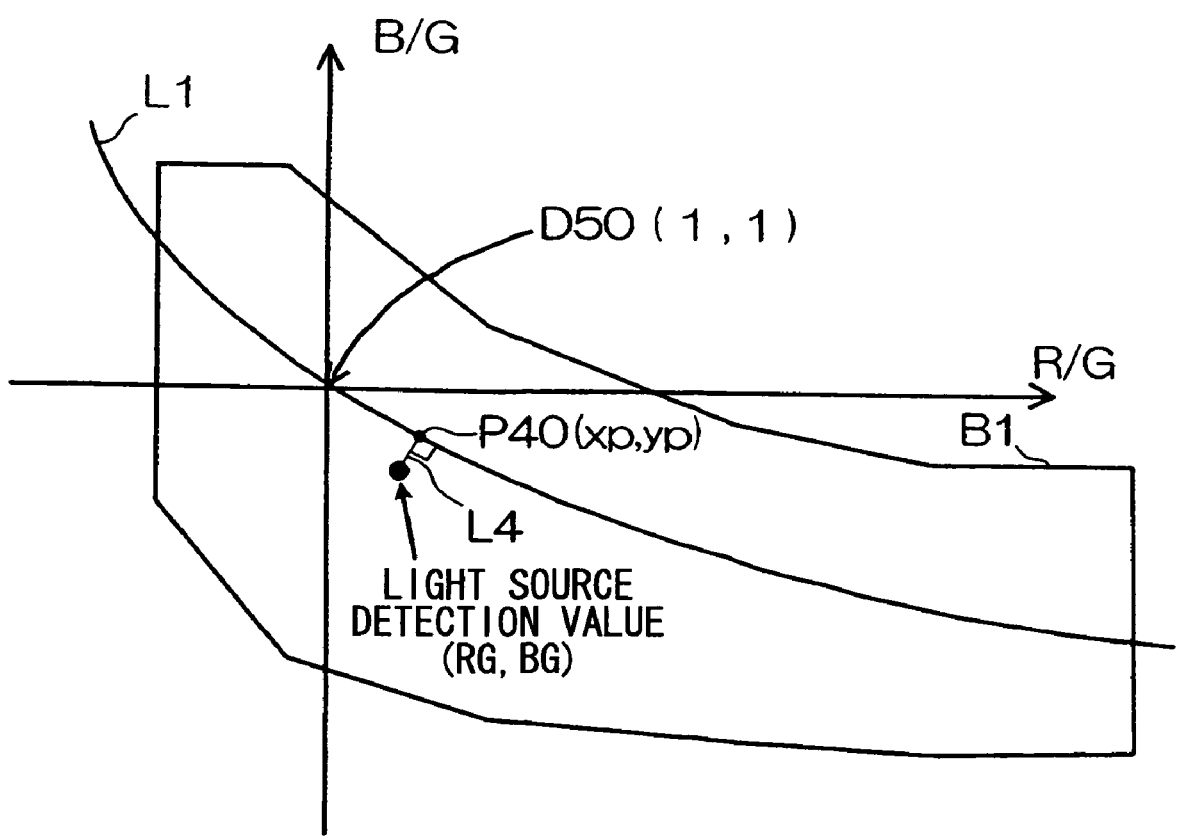
FIG. 11 is a diagram showing a normal extending from the light source detection values to the black body locus.
Figure 13A:
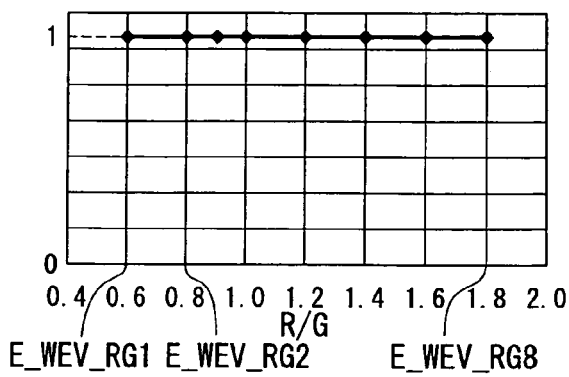
FIGS. 13A to 13H are graphs showing examples of the luminance weighting function Wy.
Figure 13E:
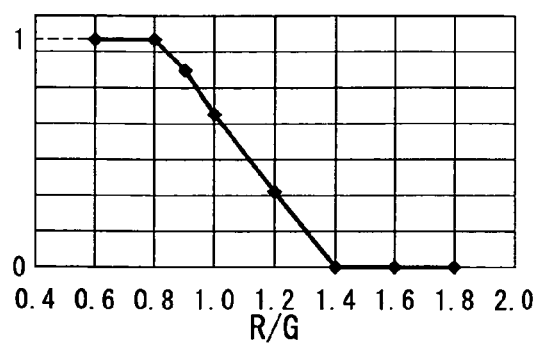
Figure 13B:
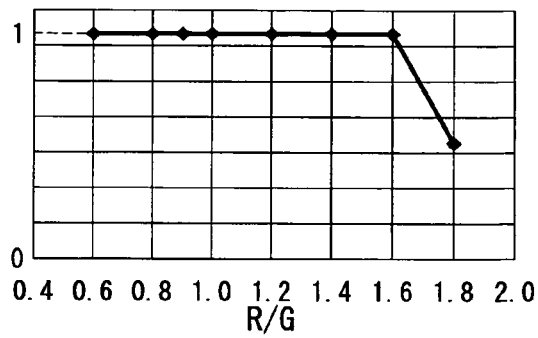
Figure 13F:
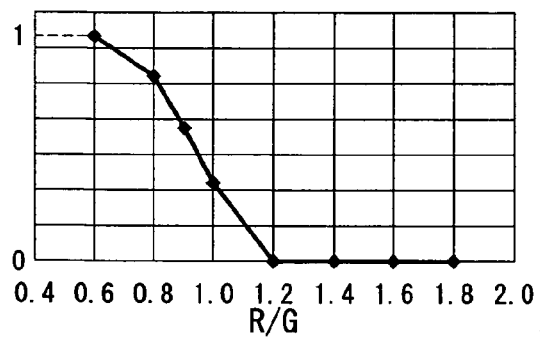
Figure 13C:
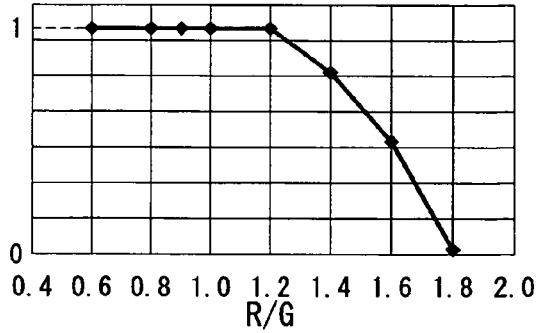
Figure 13G:
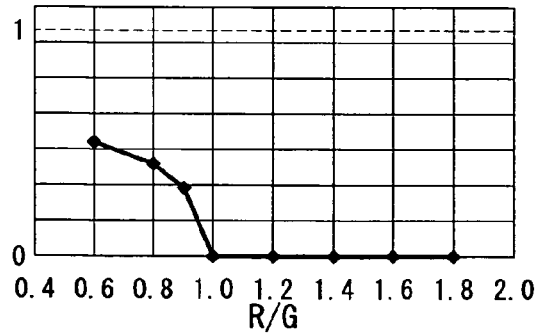
Figure 13D:
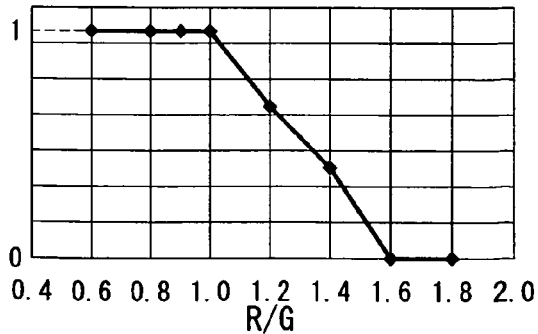
Figure 13H:
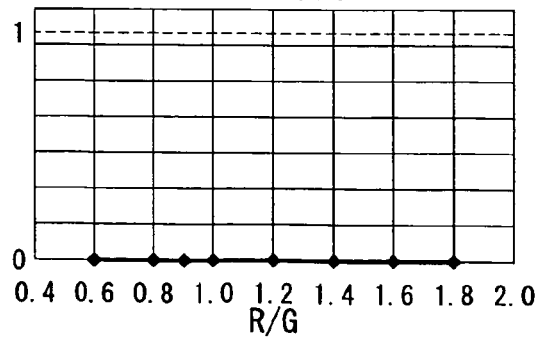

FIG. 10 is a flowchart showing a method of calculating the luminance evaluation value Lwy. First, the light source detection values (RG, BG) calculated in the step S54 of FIG. 9 are obtained (step S70). As shown in FIG. 11, coordinates P40 (xp, yp) of the intersection of a normal L4 extending from the light source detection values (RG, BG) to the black body locus L1 and the black body locus L1 are calculated (step S72).

Next, from a step S74 onward, the luminance evaluation value Lwy is calculated based on a luminance weighting function Wy stored in the EEPROM 17 in advance and the R/G coordinate xp of the point P40.

Here, the luminance weighting function Wy will be described. The luminance weighting function Wy used for calculation of the luminance evaluation value Lwy is different according to a luminance value (S1 photometric value) of the image obtained when the photographing button 24 is half pushed (S1=ON). If the luminance value (EV value) of each divided area of the image obtained by S1 photometry is Evi, an S1 photometric value (divided photometric value) Evmlti is calculated by the following formula (17).

$$Evmlti = \log_2(\Sigma_i wi \times 2^{Evi}/\Sigma_i wi) - \Delta Eviso \quad (17)$$

Here, $\Delta$Eviso is a photometric value correction amount in reference to iso200, and a weight wi is given according to FIG. 12. FIG. 12 shows the divided areas (8×8) of the image, and a number in each divided area is the weight wi.

FIGS. 13A to 13H are graphs showing examples of the luminance weighting function Wy. FIGS. 13A to 13H are the luminance weighting functions used in the case where the S1 photometric values are 8 EV to 15 EV respectively. FIGS. 13A to 13H show eight values of the luminance weighting functions Wy correspondingly to R/G coordinates respectively. The following description will describe the eight points in FIGS. 13 in ascending order of the R/G coordinates as E_WEV_RG1, E_WEV_RG2, . . . , E_WEV_RG8, and the values of the luminance weighting functions Wy corresponding thereto as Wy1, Wy2, . . . , Wy8.

Returning to the description of the flowchart of FIG. 10, in the case where, to begin with, the R/G coordinate xp of the point P40 is less than the minimum value E_WEV_RG1 of the R/G coordinates of the luminance weighting functions Wy (xp<E_WEV_RG1) in a step S74, a table of the luminance weighting functions Wy corresponding to the S1 photometric values of the image is read from the EEPROM 17 to obtain the value of Wy1 so as to be Lwy=Wy1 (step S76). In the case where the R/G coordinate xp of the point P40 is equal to or more than the minimum value E_WEV_RG1 of the R/G coordinates of the luminance weighting functions Wy (xp$\geq$E_WEV_RG1) in a step S74, it then proceeds to a step S78. And in the case where the R/G coordinate xp of the point P40 is equal to or more than the maximum value E_WEV_RG8 of the R/G coordinates of the luminance weighting functions Wy (xp$\geq$E_WEV_RG8) in a step S78, the value of Wy8 is obtained from the table of the luminance weighting functions Wy so as to be LWy=Wy8 (step S80).

Figure 14:
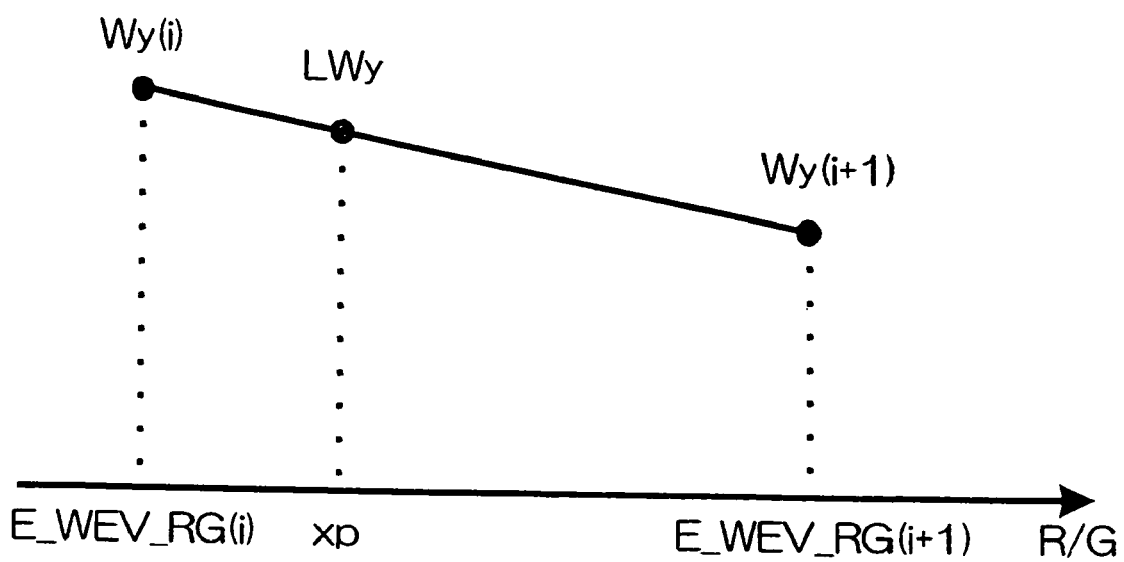
FIG. 14 is a diagram schematically showing the method of calculating a luminance evaluation value Lwy.

In the case where the R/G coordinate xp of the point P40 is less than the maximum value E_WEV_RG8 of the R/G coordinates of the luminance weighting functions Wy (E_WEV_RG1$\leq$xp<E_WEV_RG8) in a step S78, coordinates E_WEV_RG (i), E_WEV_RG (i+1) of the points sandwiching the R/G coordinate xp out of the eight points of E_WEV_RG1, E_WEV_RG2, . . . , E_WEV_RG8 are obtained as shown in FIG. 14 (step S82). And values Wy (i), Wy (i+1) of the luminance weighting functions corresponding to the coordinates E_WEV_RG (i), E_WEV_RG (i+1) are obtained (step S84) so as to calculate the luminance evaluation value Lwy by the following formula (18) (step S86).

$$Lwy = \{(E\_WEV_{RG}(i+1)-xp) \times Wy(i) + (xp-E\_WEV\_RG(i)) \times Wy(i+1)\}/(E\_WEV\_RG(i+1)-E\_WEV\_RG(i)) \quad (18)$$

Returning to the description of the flowchart of FIG. 9, the gain for the white balance control is then calculated (step S58). Hereunder, a description will be given as to a gain calculation method for the white balance control. If the reference gains prerecorded on the image-taking apparatus 10 are Rd, Gd and Bd as with the step S28 of FIG. 2, total gains are represented by the following formulas (19) to (21).

$$Gr' = (Gr - Rd) \times (Lw \times Lwy) + Rd \quad (19)$$

$$Gg' = (Gg - Gd) \times (Lw \times Lwy) + Gd \quad (20)$$

$$Gb' = (Gb - Bd) \times (Lw \times Lwy) + Bd \quad (21)$$

The total gains on the flash lamp on are calculated as above based on the reference gains for the flash lamp on Rst, Gst and Bst, a low word correction coefficient Lwst and a luminance evaluation value Lwys, and are represented by the following formulas (22) to (24).

$$Grst'=(Gr-Rst)\times(Lwst\times LWys)+Rst \quad (22)$$

$$Ggst'=(Gg-Gst)\times(Lwst\times LWys)+Gst \quad (23)$$

$$Gbst'=(Gb-Bst)\times(Lwst\times LWys)+Bst \quad (24)$$

According to the second embodiment, the white balance correction value (white balance gain) is calculated by using the luminance weighting function according to the luminance value (S1 photometric value) of the image. Thus, it is possible to reduce the color failure when controlling the white balance.

Next, a third embodiment of the present invention will be described. According to the third embodiment, the light source detection values are calculated based on the weighted average of the distribution of the color information (the step S24 of FIG. 2 and step S54 of FIG. 9). If the R/G coordinate and B/G coordinate of the color distribution are xi and yi respectively, the weighted averages (Xave, Yave) of the color distribution are represented by the following formulas (25) and (26).

$$Xave=\Sigma ixi Wi/\Sigma i\ Wi \quad (25)$$

$$Yave=\Sigma iyi Wi/\Sigma i\ Wi \quad (26)$$

Figure 15:
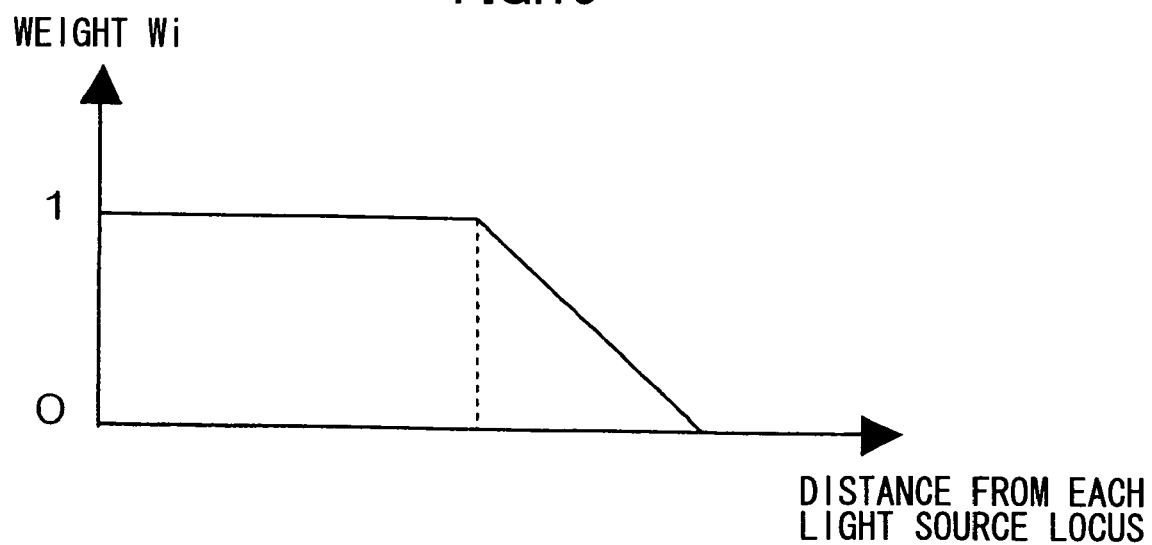
FIG. 15 is a graph showing a weight Wi.

FIG. 15 is a graph showing the weight Wi. In the R/G and B/G color space, the weight Wi related to the color information distributed above the black body locus changes according to the distance from the black body locus, and the weight Wi related to the color information distributed below the fluorescent lamp locus changes according to the distance from the fluorescent lamp locus.

Therefore, a distance dave' between the reference point D50 (1, 1) and the weighted averages (Xave, Yave) (refer to FIG. 7) is represented by the following formula (27).

$$dave'=\{(Xave-1.0)^2+(Yave-1.0)\}^{1/2} \quad (27)$$

And the light source detection values (XLSC, YLSC) of the third embodiment are represented by the following formulas (28) and (29). The weight WLi is the same as that in the above-mentioned embodiment (formulas (4), (5) and FIG. 8).

$$XLSC=\Sigma ixiWiWLi/\Sigma i\ WiWLitm \quad (28)$$

$$YLSC=\Sigma iyiWiWLi/\Sigma i\ WiWLi \quad (29)$$

Therefore, 100-percent complete correction gains are represented by the following formulas (30) to (32). And total gains are the same as those in the above-mentioned embodiment.

$$Gr=gri\_t\times Gd=Rd/XLSC \quad (30)$$

$$Gg=Gd \quad (31)$$

$$Gb=gbi\_t\times Gd=Bd/YLSC \quad (32)$$

According to the third embodiment, it is possible to tone down the influence of the object color on the light source detection by increasing the weight Wi exerted on the color information close to the first and second light source loci (black body locus and fluorescent lamp locus).

What is claimed is:

1. A white balance control method comprising the steps of:
   (a) dividing an image inputted via an imaging device into multiple divided areas and obtaining a color information on each divided area;
   (b) correcting distribution of the color information in the multiple divided areas of a predetermined color space based on light source loci which are a first light source locus indicating a color change of an object due to a color temperature on the color space and a second light source locus different from the first light source locus;
   (c) obtaining a light source information under photographing conditions based on the color information corrected in the step (b);
   (d) calculating a white balance correction value based on the light source information obtained in the step (c); and
   (e) controlling a white balance based on the white balance correction value calculated in the step (d), wherein
   in the step (b), no correction is made to the color information distributed at a position sandwiched between the first and second light source loci, and
   the color information distributed at a position not sandwiched between the first and second light source loci is brought close to a nearer one of the first and second light source loci.

2. A white balance control apparatus, comprising:
   a color information obtaining device which divides an image inputted via an imaging device into multiple divided areas and obtains color information on each divided area;
   a color information correcting device which corrects distribution of the color information in the multiple divided areas of a predetermined color space based on light source loci which are loci of a color change of an object due to a color temperature on the color space;
   a light source information obtaining device which obtains light source information under photographing conditions based on the corrected color information;
   a white balance correction value calculating device which calculates a white balance correction value based on the obtained light source information; and
   a white balance adjusting device which adjusts a white balance based on the calculated white balance correction value,
   wherein the light source loci are a first light source locus indicating the color change on changing the color temperature of a light source and a second light source locus different from the first light source locus, wherein
   the color information correcting device makes no correction to the color information distributed at a position sandwiched between the first and second light source loci and brings the color information distributed at a position not sandwiched between the first and second light source loci close to a nearer one of the first and second light source loci.

3. The white balance control apparatus according to claim 2, wherein the second light source locus is the light source locus going through color distribution in the case of using a cool white fluorescent lamp as the light source or more distant from the first light source locus than the color distribution.

4. The white balance control apparatus according to claim 3, wherein the second light source locus is located lower than the first light source locus in R/G and B/G color space.

5. The white balance control apparatus according to claim 4, wherein the color information obtaining device calculates an integrated value of R, G and B signals of the color information in the divided areas to calculate a R/G ratio and a B/G ratio, and
   the color information correcting device moves the color information distributed higher than the first light source locus closer to the first light source locus and moves the color information distributed lower than the second light source locus closer to the second light source locus in the R/G and B/G color space.

6. The white balance control apparatus according to claim 5, wherein
the color information correcting device brings the color information distributed higher than the first light source locus closer to the first light source locus in a R/G direction and brings the color information distributed lower than the second light source locus closer to a normal direction of the second light source locus in the R/G and B/G color space.

7. The white balance control apparatus according to claim 6, wherein the color information correcting device changes a correction amount of the color information according to a distance between the first or second light source locus and the color information in the R/G and B/G color space.

8. The white balance control apparatus according to claim 7, wherein the light source information obtaining device calculates first color information from the distribution of the corrected color information in the R/G and B/G color space and obtains the light source information based on R/G and B/G color coordinates of the first color information.

9. The white balance control apparatus according to claim 8, wherein
the light source information obtaining device uses second color information as a light source detection value, the second color information calculated from the distribution of the color information distributed in a circle of which radius is a line segment connecting a reference point of the R/G and B/G color space as a center thereof to the first color information.

10. The white balance control apparatus according to claim 9, wherein the light source information obtaining device calculates the first or second color information by means of weighted average of the color information.

11. An image-taking apparatus wherein the white balance control apparatus according to claim 10 is provided.

12. The white balance control apparatus according to claim 2, wherein
the light source information obtaining device uses second color information as a light source detection value, the second color information calculated from the distribution of the color information distributed in a circle of which radius is a line segment connecting a reference point of the R/G and B/G color space as a center thereof to the first color information.

13. The white balance control apparatus according to claim 12, wherein the light source information obtaining device calculates the first or second color information by means of weighted average of the color information.

14. A white balance control apparatus, comprising:
a color information obtaining device which divides an image inputted via an imaging device into multiple divided areas and obtains color information on each divided area;
a color information correcting device which corrects distribution of the color information in the multiple divided areas of a predetermined color space based on light source loci which are loci of a color change of an object due to a color temperature on the color space;
a light source information obtaining device which obtains light source information under photographing conditions based on the corrected color information;
a white balance correction value calculating device which calculates a white balance correction value based on the obtained light source information; and
a white balance adjusting device which adjusts a white balance based on the calculated white balance correction value,
wherein the light source loci are a first light source locus indicating the color change on changing the color temperature of a light source and a second light source locus different from the first light source locus,
wherein the color information obtaining device calculates an integrated value of R, G and B signals of the color information in the divided areas to calculate a R/G ratio and a B/G ratio, and
the color information correcting device moves the color information distributed higher than the first light source locus closer to the first light source locus and moves the color information distributed lower than the second light source locus closer to the second light source locus in the R/G and B/G color space.

15. The white balance control apparatus according to claim 14, wherein
the color information correcting device brings the color information distributed higher than the first light source locus closer to the first light source locus in a R/G direction and brings the color information distributed lower than the second light source locus closer to a normal direction of the second light source locus in the R/G and B/G color space.

* * * * *